Sept. 10, 1946.   P. HEYNISCH   2,407,369
MEAN-VALUE INDICATOR WITH EXCESS COUNTER
Filed Dec. 14, 1942
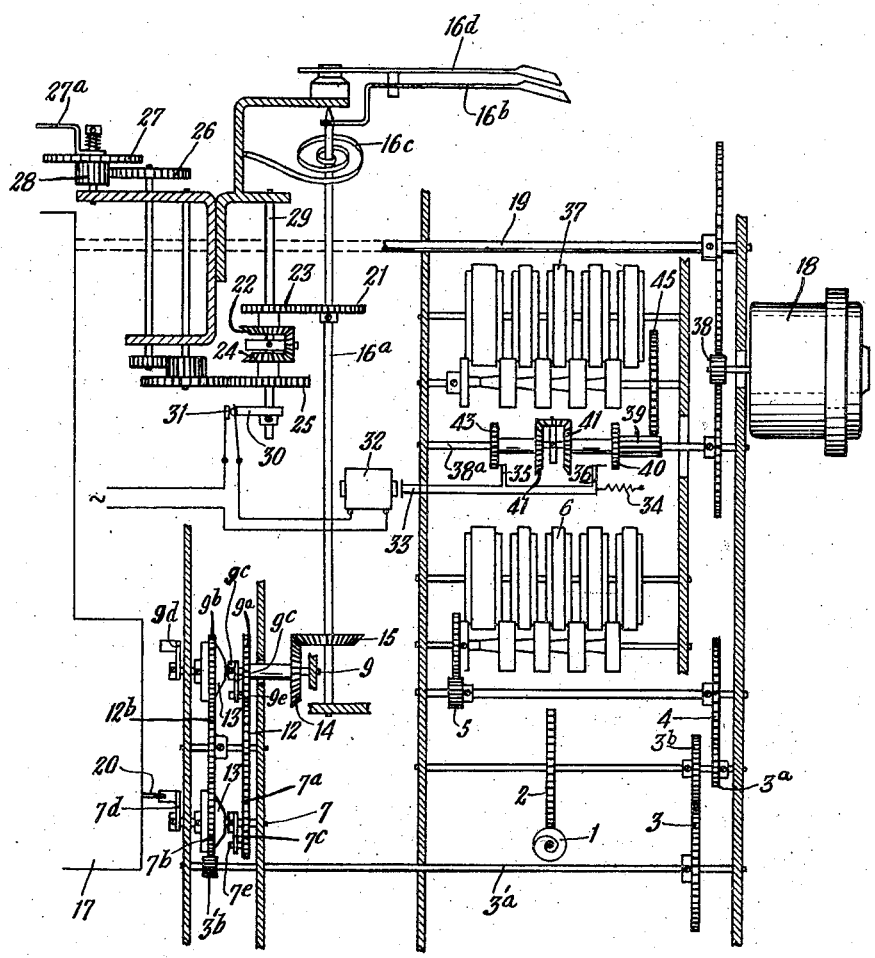
INVENTOR
Paul Heynisch
BY
ATTORNEY Patented Sept. 10, 1946

2,407,369

UNITED STATES PATENT OFFICE 2,407,369

MEAN-VALUE INDICATOR WITH EXCESS COUNTER

Paul Heynisch, Zug, Switzerland, assignor to Landis & Gyr, A. G., a corporation of Switzerland Application December 14, 1942, Serial No. 469,036
In Switzerland December 24, 1941

3 Claims. (Cl. 171—34)

1

The present invention relates to apparatus for indicating mean values and refers to a device of this kind provided with an excess demand counter.

The majority of power agreements with electric power stations are based on the principle that, below a specified load limit, the energy consumed by a customer is used under favorable conditions. For energy used in excess of the load limit, it is customary to provide a different rate. It is clear that such a method of charging for power may result in some hardship on a customer. In order to reduce such hardships and to be able to determine more accurately whether there has been any overstepping of the agreed load limit, meters have been provided with a suitable means for recording the number of excess power demands in addition to providing indications for maximum power demanded. Therefore, an excess power register may indicate the number of recording periods during which the agreed maximum power has been exceeded.

Recording periods are time intervals which can only be counted when they are consecutive and not overlapping. In view of this, a device with excess counter according to the invention has been created for mean value indicators designed as maximum meters operating with a plurality of overlapped recording periods. The essence of it is characterized in that for the duration of the excesses of the tariff limit a special counting train is coupled with a timing element. In this way the time during which the load mean-value oversteps the tariff limit can be measured by means of such a maximum demand measuring device. Conditions are preferably so chosen that the last type wheel of the cyclometer counter revolves once in one hour so that the excess time can be simply and immediately read off.

The accompanying drawing illustrates by way of example one fundamental form of embodiment incorporating the invention.

Worm 1 of the meter armature drives worm wheel 2 and thus gears 3a and 3b coupled thereto. Meshing with gear 3a is gear 4, which is rigidly coupled to a shaft carrying pinion 5. Pinion 5 drives counting train 6 registering total power consumption. Gear 3b meshes with gear 3 on shaft 3'a, which shaft carries pinion 3'b. Pinion 3'b operates a driving mechanism consisting of a system of five shafts 7 to 11 inclusive. The drawing actually shows only shafts 7 and 9 together with their associated parts. Each of shafts 7 to 11 inclusive carries two wheels 7a to 11a and 7b to 11b inclusive respectively and two levers 7c to 11c and 7d to 11d inclusive. The a series of gears

2 are coupled among themselves by gear 12, while the b series of gears are similarly coupled among themselves by gear 12b, gears 12 and 12b being disposed on a centrally located shaft.

As is evident from the drawing, the a series of gears and the b series of gears forms two gear assemblies side by side, each disposed in a plane. All gears of the b series are coupled to their respective shafts by friction disks 13, the shafts carrying levers or steering members 7d to 11d inclusive and forming driving elements. The gears in the a series are loose on their corresponding shafts, each gear carrying a pusher pin 7e to 11e inclusive, these pins cooperating with levers or pushers 7c to 11c inclusive rigidly disposed on their shafts and forming transmission elements. Thus, the c and d series of levers are rigidly mounted on the shaft. Due to the coupling of the b series of gears through center gear 12, it is clear that a definite angular motion of any one gear will be communicated to all of the b series of gears.

Through one of the pusher gears, such as 9a for example, the a series of gears are effectively coupled to bevel gearing 14 and 15. Bevel gear 15 is carried by vertical shaft 16a at the free end of which pusher arm 16b functioning as a pointer is carried.

Pusher pointer 16b is subjected to the influence of spiral spring 16c which urges pointer 16b and its shaft 16a and thus, through the gearing, in a direction opposite to the movement caused by the c series of pushers.

Pusher pointer 16b functioning as a load mean value indicator is connected in a well known manner as shown in the drawing with pointer 16d, which latter may serve as a maximum indicator.

Let it be assumed that the recording or clock period is fifteen minutes. In such case, the reset of each of the five pushers of the c series or the d series of levers back to their respective initial positions occurs every three minutes. This is due to the action of reset means operating on the d series of levers whereby the corresponding shafts and their pushers, the c series, are consecutively set back to zero.

The reset means may consist of device 17 carrying lever 20. Reset device 17 is driven by synchronous motor 18, which functions as a timing means for determining the duration of clock periods, this duration being imparted to shaft 19 through suitable gearing. Thus, lever 20 of reset 17 operating on a fifteen minute recording period cooperates with the five pushers and every three minutes affects one pusher after another of the c series to reset the same to zero. Thus, simultaneously all the a series of gears with their respective pusher pins are turned back by spring 16c until one of the e series of pins engages a pusher of the c series.

Shaft 16a which is driven from the meter armature via pusher device whose rotary movements consequently represent a measure for the mean-value of the energy consumption is coupled with an advancing mechanism. This comprises in the main a differential gear, one sungear 22 thereof being connected through gears 23 and 21 with the shaft 16a, whereas second sungear 24 is connected through a corresponding gear 25 with a contrivance for setting the tariff limit. This consists of two graduated dials 26 and 27 for approximate and fine adjustment, the disk or dial 26 being designed as toothed gear coupled through pinion 28 with graduated dial 27 made of transparent material. Handle 27a on disk 27 serves to turn graduated dials 26 and 27 against friction to set the desired tariff limit. The gear ratio between the two graduated dials is suitably placed at 1 to 3, dial 26 being for approximate and dial 27 for fine adjustment. The planetary gear shaft of the differential carries cam disk 30 which cooperates with switch contacts 31 in circuit with a coil of electro-magnet 32. Armature 33, biased by a spring 34, bears two pawls 35 and 36 with which it controls a coupling which during the excess times connects counter 37 with the synchronous motor serving as timing element.

Synchronous motor 18 as timing element determining the recording period of the whole device and consequently running constantly is connected through gear 38 with planetary gear shaft 38a of a differential gear forming the coupling between excess counter 37 and synchronous motor 18. On sungear 41 of this differential coupling carries ratchet wheel 40 and pinion 39 through which it is coupled with the gear 45 of excess counter 37. Sungear 42 is rigidly connected to ratchet wheel 43, but otherwise is loose on the shaft.

The mode of action of the entire mechanism is as follows:

By means of handle 27a the prescribed tariff limit is set on the graduated disks to a value at whose excess the counter 37 is to be switched on. By this adjustment cam disk 30 takes a specified angular position to switch 31.

As soon as the shaft 16a driven from the counter or meter armature, i. e. worm 1, through the pusher device has taken the prescribed angle, that is to say as the mean value of the energy consumption has reached the tariff limit, switch 31 is closed and the coil of the magnet energized. By this means armature 33 with pawls 35 and 36 is attracted against the action of spring 34. Thereby ratchet 43 and with it sungear 42 are locked and sungear 41 with gears 40 and 39 set free so that synchronous motor 18 drives counting train 37 over the differential and gear 45.

When switch 31 is open, i. e. as long as cam 30 does not turn enough to close switch 31, magnet 32 is not energized. Pawl 35 locks ratchet 40 with pinion 39 and therewith sungear 41 and counting train 37. However, motor 18 continues to run freely for driving reset device 17.

Structurally the device is simplified by the fact that the cyclometer type rolls, the pinion drives, the differential arrangements, the controls as well as the electro-magnetic relays are of a type used in two-rate meters and need only be assembled in the manner described according to the invention.

I wish to be understood that I do not desire to be limited to the exact details of construction shown and described, for obvious modifications will occur to a person skilled in the art. In particular, in place of the electro-magnetic relays with electric contact, mechanical relays may be provided, for instance in such a way that when the advanced work is overtaken by the retarded work a stop releases a spring which couples the excess counting work with the synchronous motor. Nor need the synchronous motor driving the reset device be utilized as timing element, although in the present example this proves particularly suitable. The timing element may also consist of some other organ, e. g. an independent clock-controlled motor.

The means for providing overlapping demand intervals are disclosed and claimed in my copending application, Serial Number 469,035, filed December 14, 1942, now United States Patent 2,382,009.

What I claim is:

1. A maximum demand meter including a meter driven driving mechanism embodying driving elements adapted to be successively reset to provide overlapping demand intervals, a timer, means operated thereby for resetting the driving elements, an excess counter, gearing for operating the counter from the timer, a coupler for throwing said gearing into and out of action, and normally holding the same out of action, and, electrical means for operating the coupler to throw the gearing into action for operating the counter including a switch, a cam operated from the driving mechanism when the rate of metering energy exceeds a predetermined value for closing the switch, and means for varying the action of the cam.

2. A maximum demand meter including a meter driven driving mechanism embodying driving elements adapted to be successively reset to provide overlapping demand intervals, a timer, means operated thereby for resetting the driving elements, an excess counter, gearing for operating the counter from the timer, a coupler for throwing said gearing into and out of action and normally holding the same out of action, electrical means for operating the coupler to throw the gearing into action for operating the counter including a switch, a rotary cam operated from the driving mechanism when the rate of metering energy exceeds a predetermined value, and a device for setting a predetermined tariff limit and coordinately advancing or retracting the cam to vary the action thereof.

3. A maximum demand meter including in combination a meter mechanism embodying elements adapted to be successively reset to provide overlapping demand intervals, a demand indicator operated thereby, a timer, means operated by the timer for resetting said elements, a counting mechanism adapted to be operated by the timer, gearing for operating the counting mechanism from the timer, an electrically operated coupler for throwing the gearing into and out of action and normally holding the same from action, a cam operated switch for operating the coupler to throw the gearing into action when the rate of metering energy exceeds a predetermined value, and means for advancing or retarding the action of the cam.

PAUL HEYNISCH.